May 10, 1949.  J. B. PARKER, JR  2,469,403
THREE AXIS ATTITUDE AND DIRECTION INDICATOR
Filed June 5, 1946
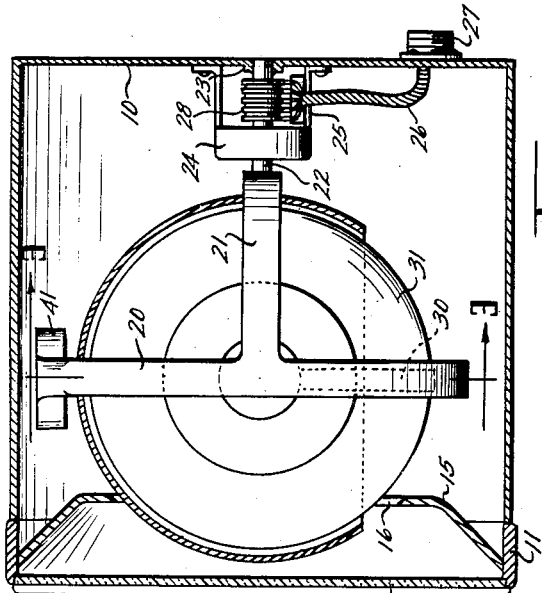
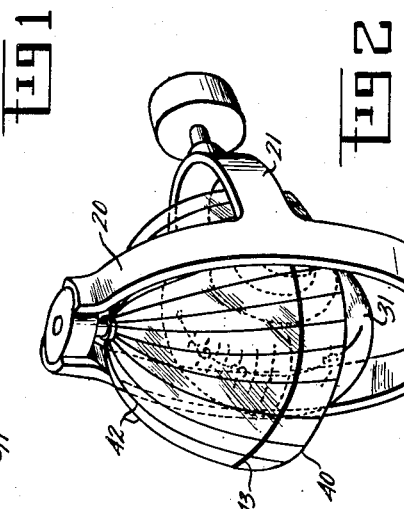
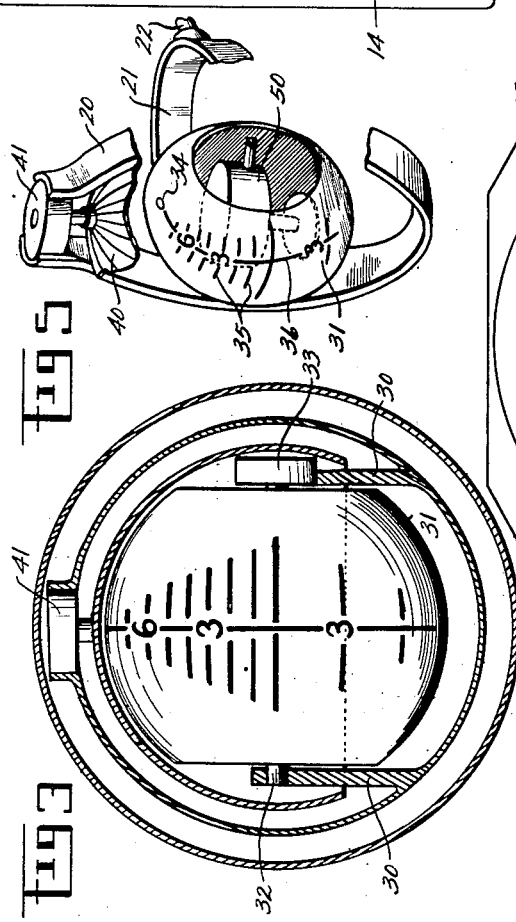
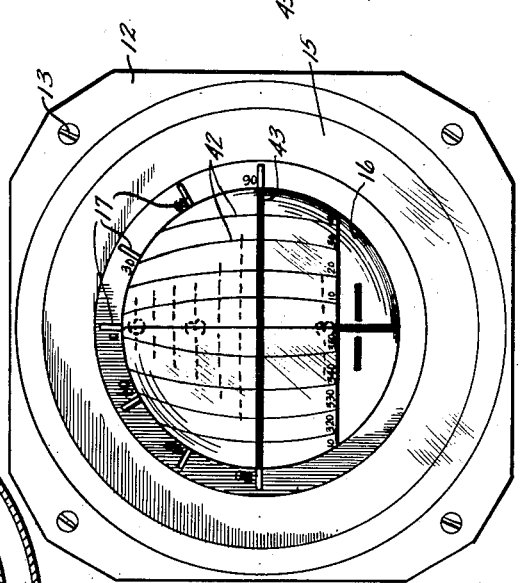
INVENTOR.
JOSEPH B. PARKER JR.
BY
—HIS ATTORNEYS—

Patented May 10, 1949

2,469,403

UNITED STATES PATENT OFFICE 2,469,403

THREE AXIS ATTITUDE AND DIRECTION INDICATOR

Joseph B. Parker, Jr., Syracuse, N. Y.

Application June 5, 1946, Serial No. 674,407

9 Claims. (Cl. 33—204)

(Granted under the act of March 3, 1883, as amended April 30, 1928; 370 O. G. 757)

The invention described herein may be manufactured and used by or for the Government for governmental purposes without payment to me of any royalty thereon.

This invention relates to a directional horizon or three axis indicating instrument for aircraft in which the indication of direction and attitude are readily determined from a single instrument.

A simple and practical single indicating instrument capable of giving combined directional and attitude references through 360 degrees for all flight conditions is considered a most desirable arrangement in the field of aeronautics. Heretofore, in the already overly crowded instrument panel of aircraft it has been conventional to use two instruments for determining the attitude and direction of the aircraft when in flight, namely the directional or azimuth indicator and the attitude indicator. These two reference indicators are so closely related in actual use that a pilot attempts to get simultaneous readings which cause him confusion and strain in checking both of these indicators to get a complete reference of the aircraft's attitude and direction with respect to the earth. In the present day of even faster aircraft it is highly advantageous to simplify the indicators to which the pilot must refer in order that his attention is not diverted from the field of vision longer than is reasonably necessary for assurance of safety in flight. While indicators providing attitude and directional reference in wich some of the reference indications operate within limits are known and have proved successful in their purpose, as that disclosed in Patent 2,283,190, issued to C. J. Crane on May 19, 1942, the present invention is considered more adaptable for operation with the present day master gyroscopes as incorporated in automatic pilots, and the like, for giving a reference indication throughout 360 degrees of the attitude and direction of the aircraft.

The present invention is intended to overcome the above mentioned disadvantages and discomforts of the pilot in a simplified manner to increase the probability of safety in the air by an arrangement whereby the indications of the directional and attitude indicators are incorporated into a single directional horizon or three axis indicator instrument that is simple and light in construction and readily read and understood with numerical references to the aircraft's attitude and direction for 360 degrees in any position and to be readily adaptable to present day master gyroscopes. The instrument can be fabricated in a standard instrument case and it will not require internal lighting as is necessary in many aircraft instruments. The present invention will greatly facilitate "blind" or "instrument" and acrobatical flying in that a pilot will be able to more quickly and easily coordinate his sense impressions by referring to the single instrument in which none of the indicated references throughout their 360 degrees are thrown into substantial error in response to any maneuvering.

A principal object of my invention is to provide a directional horizon or three axis indicator for aircraft which is universally mounted in all axes to register direction, pitch and bank of the aircraft under all flight conditions.

A further object of my invention is to provide a directional horizon or three axis flight indicator for aircraft in which there is a gimbal ring supported on a longitudially rotatably mounted gimbal shaft and supporting two spheres, one sphere rotatably mounted on an axis perpendicular to and in the plane of the axis of the gimbal shaft and the second sphere being transparent and hollow disposed over the first sphere on an axis normal to the axes of the first sphere and the gimbal shaft with the last mentioned axis lying in the plane of the first sphere axis, the gimbal shaft axis permitting an indication of bank, the first sphere axis permitting an indication of pitch and the second sphere axis permitting an indication of direction.

A still further object of my invention is to provide a directional horizon or three axis flight indicator for aircraft in which an instrument case with an indexed window opening has therein a gimbal ring centrally mounted on a longitudinally rotatable gimbal shaft, an indexed attitude sphere rotatably mounted within the gimbal ring on an axis normal to and in the plane of the axis of the gimbal shaft, an indexed transparent truncated hollow sphere disposed over the attitude sphere and rotatably supported by the said gimbal ring on an axis perpendicular to the axes of the gimbal shaft and attitude sphere and in the plane of the attitude sphere axis, the gimbal ring and spheres being under the control of stabilizing mechanism such that references as to attitude and direction can be determined from the relation of the indices on the spheres with each other and with the index on the instrument case window opening.

Other objects, features and advantages of this invention will become apparent as the description proceeds by way of example with reference to the accompanying drawing, in which:

Fig. 1 is a cross section through the instrument case and the directional sphere to show the suspension of the various parts;

Fig. 2 is an isometric view of the gimbal ring shown supporting the pitch and directional spheres;

Fig. 3 is a cross section taken on the line 3—3 of Fig. 1;

Fig. 4 is a front view of the instrument; and

Fig. 5 is a cutaway view similar to that of Fig. 2 showing a modification.

Referring now to Figs. 1 to 4 inclusive, there is shown a conventional instrument case 10 having a face member 11 attached thereto including an integral mounting flange 12 for attaching the instrument to an instrument panel. The face member 11 is arranged to hold a cover glass 14 and a dial 15 having a central circular opening 16 the periphery of which is provided with indicia to form a bank scale 17.

Within the instrument case 10 there is supported a complete gimbal ring 20 integral with a gimbal fork 21 that is permanently mounted on a freely rotatable gimbal shaft 22. The gimbal shaft 22 has a suitable rotatable bearing connection with the instrument case 10, shown diagrammatically at 23, such as a bearing of the frictionless type, well known in the art. The gimbal shaft 22 has in this modification a repeater self synchronous motor mechanism 24 operatively attached thereto that is retained in the arms 25 on the instrument case 10 to stabilize the rotary motion of the gimbal ring 20 in space relative to the gimbal shaft axis in response to the action of some stabilizing mechanism, as a master gyroscope (not shown). The means for operatively connecting the repeater motor mechanism to the stabilizing mechanism is through electrical conductors 26 entering through a connector 27 on the instrument case 10 to slip rings 28 on the gimbal shaft 22. Electrical connection between the slip rings 28 through the gimbal shaft, gimbal fork and gimbal ring to the point of use, as to self synchronous motors, may be effected in any well known manner.

Within the gimbal ring 20 and integral therewith are two parallel trunnion portions 30 that rotatably support an attitude sphere 31 on an axis normal to and in the plane of the axis of the gimbal shaft 22. The attitude sphere 31 is shown diagrammatically having a rotatable bearing connection 32 with the trunnions 30 although in actual practice a frictionless bearing, well known in the art, is used to obtain the best results. A self synchronous motor mechanism 33 is arranged on one of the trunnions 30 and operatively connected to the attitude sphere 31 for repeating the stabilizing reference from the stabilizing mechanism, as a master gyroscope (not shown), to indicate the pitch angle of the aircraft in space. The motor 33 is in electrical communication with the slip rings 28. The attitude sphere 31 having a polar axis 34 has indices 35 along a meridian line 36 passing through the polar axis which are all preferably inscribed with a luminous material. Further, it is preferable that the background of the top half of the attitude sphere 31 be of a light color while the bottom half of the background be of a dark color to aid the pilot in readily determining whether the aircraft is heading skyward or groundward.

Also within the gimbal ring 20 there is rotatably supported a transparent directional partial or truncated hollow sphere 40, hereinafter referred to as the "directional sphere," by a suitable frictionless bearing connection incorporated in an azimuth self synchronous motor mechanism 41. This motor 41 is electrically connected through the gimbal ring 20, gimbal fork 21 and gimbal shaft 22 to the slip rings 28 for transmitting the electrical power to the motor 41 from a directional stabilizing mechanism, as a master directional gyroscope, magnetic compass, or other magnetic sensitive device (not shown) to stabilize the directional sphere in space. The directional sphere 40 has meridian lines 42 and a horizontal or equator line 43 thereon of some luminous material. The meridian lines 42 are placed at suitable intervals, preferably to register 360 degrees therearound. While the horizontal or equator line 43 is illustrated as being on the directional sphere 40 such a horizontal reference line may be arranged on the dial 15 of the instrument case 10 in the usual manner, if more desirable.

The gimbal ring 20 with all its carried parts is constructed and arranged to be in perfect balance with respect to the axis through the gimbal shaft 22 which is necessary for the proper operation of the instrument.

In operation, the bank angle, pitch angle and turn angle can be readily determined from the face of this instrument. The bank angle is determined by noting the position of the meridian line 36 of the attitude sphere 31 with respect to the bank scale 17 on the dial 15 of the instrument case; the pitch angle can be ascertained by reading the indices 35 on the attitude sphere with respect to the horizontal reference line 43 on the direction sphere; and the azimuth or directional indication is represented by the rotation of the directional sphere 40 and the exact heading can be obtained by observing the reading at the meridian line 36 of the attitude sphere 31 and the meridian lines 42 on the directional sphere 40. Since the directional sphere 40 is transparent the indicia on the attitude sphere 31 can readily be compared to the indicia on the directional sphere 40 and the dial 15. The gimbal ring 20 has no stops in relation to the instrument case 10 such that the instrument case, which is bodily fastened to the aircraft, may revolve indefinitely around the gimbal ring 20 and its carried parts without altering the position of the gimbal ring. Likewise, the instrument case and gimbal ring may revolve 360 degrees about the axis of the attitude sphere 31 without altering the position of this sphere or interfering with the operation of the directional sphere 40 which is free to rotate 360 degrees about its own axis. This construction and arrangement of parts permits a correct degree reading of all three reference indications regardless of the attitude and direction of the aircraft.

The modification shown and described in Figs. 1 to 4 inclusive, provides a repeater indicating instrument in which the self synchronous motor mechanisms merely maintain the gimbal ring, attitude sphere and directional sphere stable in space in accordance with the stabilizing mechanisms that may be located remotely from the indicator to register those references on the indicating instrument. The motors 24 and 33 may be eliminated and a vertical gyroscope incorporated within the attitude sphere 31, as illustrated in Fig. 5, in which like parts retain the same reference characters. The attitude sphere 31 is rotatably mounted at 32 and the gimbal shaft 22 is constructed in the same manner as that described in referring to Figs. 1 to 4 inclusive, to the exclusion of the motors 24 and 33. A gyroscope carriage 50 housing a vertical gyro is supported on the polar axis 34 of the attitude sphere 31 to provide the "gyroscopic inertia" necessary for stabilizing the pitch and bank references.

The operation of the vertical gyro within the attitude sphere 31 will act to prevent the attitude sphere 31 from deviating from its predetermined upright position and to further prevent the gimbal ring from rotating about the axis of the gimbal shaft 22 regardless of the position taken by the instrument case of the aircraft. The operation of the directional sphere as a repeater remains unchanged and the indication of the aircraft position is obtained in like manner as described with reference to Figs. 1 to 4 inclusive.

The directional horizon or three axis indicator does not require any more space on the instrument panel than the attitude indicator now in common use and makes possible the elimination of one instrument from the crowded instrument panel. The construction allowing this instrument to be fabricated within the standard instrument case provides an inexpensive device and adapts it to be installed in aircraft now in service. Under any flight condition the complete attitude and direction of the aircraft can be quickly and easily determined at a glance. The two spheres having their respective indices cooperating to register the direction, pitch and bank angles present a more realistic picture of the complete flight attitude and direction than with the horizon indicator and the directional indicator now commonly in use. The instrument of this invention can be easily read day or night without the use of any internal lighting which has proved objectionable to pilots under conditions of night flying.

The invention thus provides a directional horizon indicating instrument that is simple and compact in construction and efficient in operation to directly and correctly indicate accurately on a single face all the references throughout 360 degrees by which the attitude and direction of the aircraft may be determined.

It is to be understood that the illustrations of the preferred embodiments are not to be so limited since various changes and arrangements may be made without departing from the spirit and scope of my invention.

I claim:

1. A directional horizon or three axis indicator for aircraft comprising; an instrument case having an indexed window opening; a gimbal shaft longitudinally rotatably mounted within the instrument case; a gimbal ring centrally supported on the said gimbal shaft with the diametrical axes normal to the gimbal shaft axis; an attitude sphere rotatably mounted within the said gimbal ring on an axis perpendicular to and in the plane of the axis of the said gimbal shaft; a transparent truncated hollow directional sphere disposed over the said attitude sphere and rotatably supported by the said gimbal ring on an axis normal to the axes of the said gimbal shaft and the said attitude sphere, the directional sphere axis being in the same plane as the attitude sphere axis; and reference indices on the spheres for determining the attitude and directional references by observing the relation of the indices on the spheres with each other and with the said index of the window opening.

2. A directional horizon or three axis indicator for aircraft comprising; an instrument case having a window opening with a scale therearound; a gimbal shaft longitudinally rotatably mounted within the said instrument case with the axis of rotation passing centrally through the window opening; a gimbal ring, having parallel trunnions on the inner periphery, centrally supported on said gimbal shaft with the diametrical axes normal to the said gimbal shaft axis of rotation; an attitude sphere rotatably mounted on the trunnions with its axis perpendicular to and in the plane of the axis of the said gimbal shaft; a transparent truncated hollow directional sphere disposed over the said attitude sphere and rotatably supported by the said gimbal ring on an axis perpendicular to the axes of the said gimbal shaft and said attitude sphere, the directional sphere axis being in the plane of the attitude sphere axis; and a meridian line with reference indices therealong around the attitude sphere equidistantly from the points of rotation and meridian lines about the directional sphere originating at the axis of rotation whereby the attitude and directional references may be determined from the relation of the indexed meridian line of the attitude sphere with respect to the meridian lines of the directional sphere and the index about the window opening.

3. A directional horizon or three axis indicator for aircraft comprising; an instrument case having an indexed window opening; a gimbal shaft longitudinally rotatably mounted within the instrument case with the axis of rotation passing centrally through the said window opening; a gimbal ring, having parallel trunnions on the inner periphery, centrally supported on the said gimbal shaft with the diametrical axes normal to the said gimbal shaft axis of rotation; an attitude sphere rotatably mounted on the trunnions with its axis perpendicular to and in the plane of the axis of the said gimbal shaft; a transparent truncated hollow directional sphere disposed over the said attitude sphere and rotatably supported by the said gimbal ring on an axis perpendicular to the axes of the said gimbal shaft and the said attitude sphere, the directional sphere axis being in the plane of the attitude sphere axis; reference indices on the spheres for determining the attitude and directional references by observing the relation of the spheres with each other and with the index of the window opening; and means for stabilizing in a predetermined oriented position the gimbal ring on the said gimbal shaft axis, the said attitude sphere and the said directional sphere.

4. In a directional horizon or three axis indicator for aircraft instruments; a gimbal shaft adapted to be longitudinally rotatably mounted at one end; a crescent-shaped gimbal fork member having its central portion affixed to the other end of the said gimbal shaft with the ends directed away from said gimbal shaft to support a gimbal ring normal thereto; a pair of parallel trunnions on the inner periphery of the said gimbal ring; an attitude sphere rotatably mounted between and supported by the said trunnions on a diametrical axis of the said gimbal ring normal to and in the same plane as the axis of the said gimbal shaft; a meridian reference line, with indices therealong, around the said attitude sphere equidistant from the axis pivotal portions thereof; a transparent truncated hollow directional sphere disposed over the said attitude sphere and rotatably supported by the said gimbal ring on an axis perpendicular to the axes of the said gimbal shaft and the said attitude sphere with the directional sphere axis being in the plane of the said attitude sphere axis; and the directional sphere having meridian reference lines passing through the axis of rotation at intervals therearound and a horizontal reference line arranged equatorially therearound whereby the position of the meridian indexed reference line of the said attitude sphere in relation to the meridian and horizontal reference lines of the said directional sphere and in relation to a true vertical are read to determine the attitude and directional references, respectively.

5. In a directional horizon or three axis indicator for aircraft instruments; a gimbal shaft adapted to be longitudinally rotatably mounted at one end; a crescent-shaped gimbal fork member having its central portion affixed to the other end of the said gimbal shaft with the ends directed away from said gimbal shaft to support a gimbal ring normal thereto; an attitude sphere rotatably mounted within the said gimbal ring on a diametrical axis thereof normal to and in the plane of the axis of the said gimbal shaft; a meridian reference line, with indices therealong, around the said attitude sphere equidistant from the axis pivotal portions thereof; a transparent truncated hollow directional sphere disposed over the attitude sphere and rotatably supported by the said gimbal ring on an axis perpendicular to the axes of the said gimbal shaft and the said attitude sphere with the directional sphere axis being in the same plane as the said attitude sphere axis; meridian reference lines passing through the axis of rotation of said directional sphere at intervals therearound and a horizontal reference line arranged equatorially around the directional sphere; and means for stabilizing the gimbal ring, attitude sphere and directional sphere in a predetermined oriented condition whereby the attitude and direction in space can be determined by the relation of the meridian indexed reference line of the said attitude sphere with the meridian and horizontal reference lines of the said directional sphere and with a true vertical.

6. A directional horizon or three axis indicator for aircraft comprising; an instrument case having an indexed window opening; a gimbal shaft longitudinally rotatably mounted within the instrument case; a gimbal ring centrally supported on the said gimbal shaft with the diametrical axes normal to the gimbal shaft axis; an attitude sphere rotatably mounted within the said gimbal ring on an axis perpendicular to and in the plane of the axis of the said gimbal shaft; a transparent truncated hollow directional sphere disposed over the said attitude sphere and rotatably supported by the said gimbal ring on an axis perpendicular to the axes of the said gimbal shaft and the said attitude sphere, the directional sphere axis being in the plane of the attitude sphere axis; servomotor mechanisms operatively fixed to the said gimbal shaft, attitude and directional spheres for transmitting motion from stabilizing mechanism; and reference indices on the spheres for determining the attitude and directional references by observing the relation of the spheres with each other and with the index of the window opening.

7. A directional horizon or three axis indicator for aircraft comprising; an instrument case having an indexed window opening; a gimbal shaft longitudinally rotatably mounted within the instrument case with the axis of the said gimbal shaft passing centrally through the window opening; a gimbal ring, having parallel trunnions on the inner periphery, centrally supported on the said gimbal shaft by a forked intermediate portion with the diametrical axes thereof normal to and in the plane of the gimbal shaft axis; an attitude sphere rotatably mounted on the trunnions with its axis perpendicular to and in the plane of the axis of the said gimbal shaft; an indexed meridian reference line around the said attitude sphere equidistant from the axis pivotal portions thereof; a transparent truncated hollow directional sphere disposed over the attitude sphere and rotatably supported by the said gimbal ring on an axis perpendicular to the axes of the said gimbal shaft and the said attitude sphere with the directional sphere axis being in the plane of the said attitude sphere axis; meridian reference lines passing through the axis of rotation of said directional sphere at intervals therearound and a horizontal reference line arranged equatorially around the said directional sphere; and motor mechanisms operatively fixed to the said gimbal shaft, attitude and directional spheres for transmitting motion from stabilizing mechanisms whereby the spheres are stabilized in a predetermined oriented condition and the relation of the indexed meridian reference line of the said attitude sphere with the indexed opening and the horizontal reference line of the said directional sphere provide the attitude reference, and the relation of the meridian reference lines of the spheres provides the directional reference of the instrument case in space.

8. A directional horizon or three axis indicator for aircraft comprising; an instrument case having an indexed window opening; a gimbal shaft longitudinally rotatably mounted within the instrument case; a gimbal ring centrally supported on the said gimbal shaft with the diametrical axes thereof normal to the axis of the said gimbal shaft; an attitude sphere rotatably mounted within the said gimbal ring on an axis perpendicular to and in the plane of the axis of the said gimbal shaft, said attitude sphere having a polar axis normal to its axis of rotation; a transparent truncated hollow directional sphere disposed over the said attitude sphere and rotatably supported by the said gimbal ring on an axis perpendicular to the axes of rotation of the said gimbal shaft and the said attitude sphere, the directional sphere axis being in the plane of the attitude sphere axis of rotation; a motor mechanism operatively connected to the said directional sphere for transmitting motion from a stabilizing mechanism; a vertical gyroscope within the attitude sphere having its axis on the polar axis of the said attitude sphere for stabilizing the attitude sphere and gimbal ring; and reference indices on the spheres whereby the attitude and directional references are determined by the relation of the spheres with each other and with the index of the window opening.

9. A directional horizon or three axis indicator for aircraft comprising; an instrument case having an indexed window opening; a gimbal shaft longitudinally rotatably mounted within the instrument case with the axis of the said gimbal shaft passing centrally through the said window opening; a gimbal ring, having parallel trunnions on the inner periphery, centrally supported on the said gimbal shaft by a forked intermediate portion with the diametrical axes thereof normal to the gimbal shaft axis; an attitude sphere rotatably mounted on the trunnions with its axis perpendicular to and in the plane of the axis of the said gimbal shaft, said attitude sphere having a polar axis normal to its axis of rotation; an indexed meridian reference line around the circumference of the said attitude sphere passing through the polar axis and lying in a plane perpendicular to the plane of the axis of rotation thereof; a transparent truncated hollow directional sphere disposed over the attitude sphere and rotatably supported by the said gimbal ring on an axis normal to the axes of rotation of the said gimbal shaft and the said attitude sphere with the directional sphere axis being in the plane of the attitude sphere axis; meridian reference lines passing through the axis of rotation at intervals therearound and a horizontal reference line arranged equatorially around the said directional sphere; a motor mechanism operatively connected to the said directional sphere for transmitting motion from a stabilizing mechanism; and a vertical gyroscope within the said attitude sphere having its axis on the said polar axis of the said attitude sphere for stabilizing the attitude sphere and gimbal ring whereby the spheres are stabilized in a predetermined oriented condition and the relation of the indexed meridian reference line of the said attitude sphere with the indexed opening and the horizontal reference line of the said directional sphere provide the attitude reference, and the relation of the meridian reference lines of the spheres provides the directional reference of the instrument case in space.

JOSEPH B. PARKER, Jr.

REFERENCES CITED

The following references are of record in the file of this patent:

UNITED STATES PATENTS

| Number | Name | Date |
|---|---|---|
| D. 139,881 | Davies et al. | Jan. 2, 1945 |
| 1,722,109 | Borresen | Oct. 29, 1929 |
| 1,989,826 | Schenck | Feb. 5, 1935 |
| 1,993,864 | Sperry | Mar. 12, 1935 |
| 2,001,038 | Reid | May 14, 1935 |
| 2,080,490 | Kollsman | May 18, 1937 |
| 2,292,732 | Anscott | Aug. 11, 1942 |
| 2,395,250 | Carlson | Feb. 19, 1946 |

FOREIGN PATENTS

| Number | Country | Date |
|---|---|---|
| 140,482 | Great Britain | Apr. 1, 1920 |